US012649477B2

(12) United States Patent
Gonzalez Cisneros

(10) Patent No.: US 12,649,477 B2
(45) Date of Patent: Jun. 9, 2026

(54) ESTIMATING AND CORRECTING BIAS IN VEHICLE MOTION CONTROL

(71) Applicant: Atieva, Inc., Newark, CA (US)

(72) Inventor: Pablo Sebastian Gonzalez Cisneros, Fremont, CA (US)

(73) Assignee: Atieva, Inc., Newark, CA (US)

( * ) Notice: Subject to any disclaimer, the term of this patent is extended or adjusted under 35 U.S.C. 154(b) by 103 days.

(21) Appl. No.: 18/362,268

(22) Filed: Jul. 31, 2023

(65) Prior Publication Data

US 2024/0051550 A1 Feb. 15, 2024

Related U.S. Application Data

(60) Provisional application No. 63/371,172, filed on Aug. 11, 2022.

(51) Int. Cl.
*B60W 40/109* (2012.01)

(52) U.S. Cl.
CPC ....... *B60W 40/109* (2013.01); *B60W 2520/26* (2013.01)

(58) Field of Classification Search
CPC ........... B60W 40/109; B60W 2520/26; B60W 2050/0215; B60W 2520/10; B60W 2520/12; B60W 2520/14; B60W 2540/18; B60W 50/06; B62D 6/002; B62D 15/024
See application file for complete search history.

(56) References Cited

U.S. PATENT DOCUMENTS

| | | | |
|---|---|---|---|
| 5,857,160 A | 1/1999 | Dickinson et al. | |
| 10,967,505 B1 * | 4/2021 | Bai | B25J 9/1605 |
| 2008/0228353 A1 * | 9/2008 | Mayfield | A01B 69/008 |
| | | | 701/41 |

(Continued)

FOREIGN PATENT DOCUMENTS

| | | | | |
|---|---|---|---|---|
| CN | 103287436 B * | 8/2016 | ........... | B60W 40/06 |
| CN | 110647042 B * | 4/2022 | ........... | G05B 13/042 |

(Continued)

OTHER PUBLICATIONS

"Shi, Lu; Karydis, Konstantinos; Enhancement for Robustness of Koopman Operator-based Data-driven Mobile Robotic Systems; Apr. 9, 2021; Dept. of Electrical and Computer Engineering, University of California, Riverside" (Year: 2021).*

(Continued)

*Primary Examiner* — Ramya P Burgess
*Assistant Examiner* — Christopher R Cardimino
(74) *Attorney, Agent, or Firm* — Brake Hughes Bellermann LLP

(57) ABSTRACT

A vehicle comprises: an advanced driver assistance system (ADAS) generating a command for an aspect of vehicle motion; an actuator for controlling the aspect of the vehicle motion, the actuator connected to the ADAS; and a bias estimator circuit that estimates a bias between the command for the aspect of vehicle motion and an effective vehicle motion aspect, the bias estimator circuit estimating the bias using an operator that predicts a next timestep of nonlinear functions of vehicle state, wherein the command for the aspect of vehicle motion is corrected using the bias estimated by the bias estimator circuit to provide a corrected command for the aspect of vehicle motion for use by the actuator.

24 Claims, 8 Drawing Sheets

800

(56)                References Cited

U.S. PATENT DOCUMENTS

| | | | | |
|---|---|---|---|---|
| 2009/0095562 | A1* | 4/2009 | Yasui | B62D 6/003 |
| | | | | 180/412 |
| 2014/0288779 | A1* | 9/2014 | Di Cairano | B62D 15/0235 |
| | | | | 701/42 |
| 2015/0057889 | A1* | 2/2015 | Tamaizumi | B62D 5/0463 |
| | | | | 701/41 |
| 2015/0352972 | A1* | 12/2015 | Li | B60L 58/12 |
| | | | | 429/62 |
| 2018/0080775 | A1* | 3/2018 | Loomis | G01C 21/165 |
| 2019/0064823 | A1* | 2/2019 | Jiang | B60W 10/20 |
| 2020/0039523 | A1* | 2/2020 | Ghasemalizadeh | B62D 15/025 |
| 2020/0207412 | A1* | 7/2020 | Al Assad | B62D 15/0245 |
| 2021/0323564 | A1* | 10/2021 | Wang | B60W 50/06 |
| 2023/0384762 | A1* | 11/2023 | Vinod | G05B 19/4155 |

FOREIGN PATENT DOCUMENTS

| | | | | |
|---|---|---|---|---|
| DE | 102014200987 | A1 * | 7/2015 | B60W 40/13 |
| WO | 2020141423 | A1 | 7/2020 | |

OTHER PUBLICATIONS

"Xiao, Yongqian; et. al.; Deep Neural Networks with Koopman Operators for Modeling and Control of Autonomous Vehicles; Aug. 17, 2021; College of Intelligence Science and Technology, National University of Defense Technology, Changsha; IEEE" (Year: 2021).*

International Search Report and Written Opinion for PCT Application No. PCT/US2023/071328, mailed on Oct. 20, 2023, 17 pages.

Wikipedia; "Recursive Least Squares Filter", Feb. 26, 2020, 9 pages.

Cibulka, Vit et al., "Model Predictive Control of a Vehicle Using Koopman Operator", arXiv:2103.04978v1; Mar. 8, 2021, 6 pages.

Kim, Dae Hyuk et al., "An Auto Weather-Vaning System for a DP Vessel That Uses a Nonlinear Controller and Disturbance Observer", Int. J. Nav. Archit. Ocean Eng., 6:98-118; http://dx.doi. org/10.2478/ IJNAOE-2013-0166; Mar. 1, 2014, pp. 98-118.

Mahtout, I. et al., "Youla-Kucera Based Lateral Controller for Autonomous Vehicle", 2018 21st International Conference on Intelligent Transportation Systms (ITSC); Nov. 4-7, 2018, pp. 3281-3286.

Bruce et al.: "Recursive Least Squares with Matrix Forgetting," 2020 American Control Conference, Denver, Co, USA, Jul. 1-3, 2020, pp. 1406-1410.

Cisneros, Pablo S.G., et al., "Data-Driven quasi-LPV Model Predictive Control Using Koopman Operator Techniques", IFAC-PapersOnLine, vol. 53, Issue 2, pp. 6062-6068, 2020, https://www.sciencedirect.com/science/article/pii/S2405896320322795.

* cited by examiner

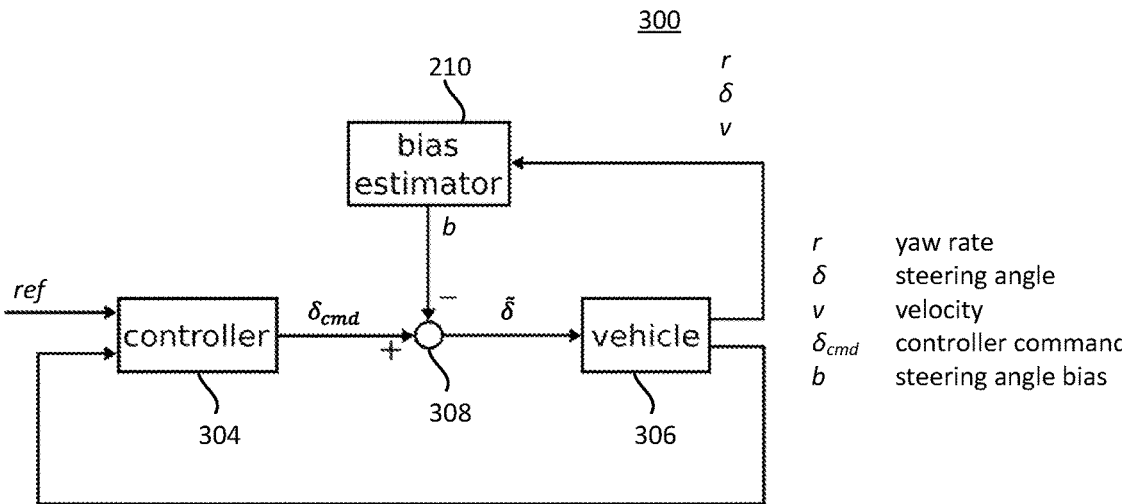

300

210 bias estimator

*r*
*δ*
*v*

*b*

*ref* controller $\delta_{cmd}$

−
+

$\tilde{\delta}$ vehicle

304

308

306

| *r* | yaw rate |
| *δ* | steering angle |
| *v* | velocity |
| $\delta_{cmd}$ | controller command |
| *b* | steering angle bias |

FIG. 3A

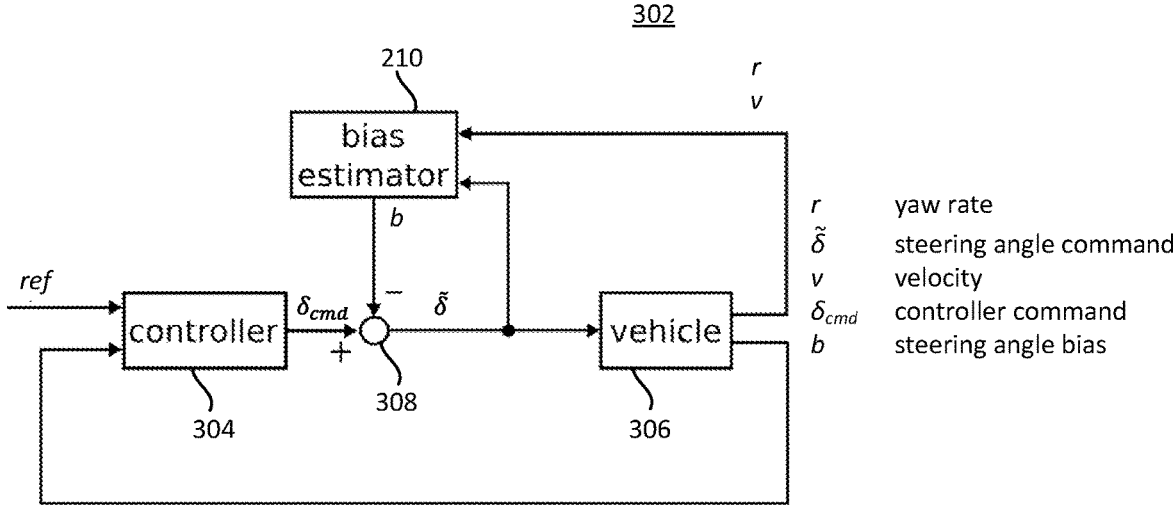

302

210 bias estimator

*r*
*v*

*b*

*ref* controller $\delta_{cmd}$

−
+

$\tilde{\delta}$ vehicle

304

308

306

| *r* | yaw rate |
| $\tilde{\delta}$ | steering angle command |
| *v* | velocity |
| $\delta_{cmd}$ | controller command |
| *b* | steering angle bias |

Generate command using ADAS
802

Estimate bias
804

Correct the command for the estimated bias
806

Provide corrected command to actuator
808

Switch architecture
810

ESTIMATING AND CORRECTING BIAS IN VEHICLE MOTION CONTROL

CROSS-REFERENCE TO RELATED APPLICATION

This application claims benefit, under 35 U.S.C. § 119, of U.S. Provisional Application No. 63/371,172, filed on Aug. 11, 2022, entitled "ESTIMATING AND CORRECTING BIAS IN VEHICLE MOTION CONTROL," the disclosure of which is incorporated by reference herein in its entirety.

TECHNICAL FIELD

This document relates to estimating and correcting bias in vehicle motion control.

BACKGROUND

Some vehicles manufactured nowadays are equipped with one or more types of systems that can at least in part handle operations relating to the driving of the vehicle. Some such assistance involves relying on sensor outputs to control vehicle motion or other functions. However, biases can occur in such systems between input commands and the effective aspect in the vehicle's operation.

SUMMARY

In a first aspect, a vehicle comprises: an advanced driver assistance system (ADAS) generating a command for an aspect of vehicle motion; an actuator for controlling the aspect of the vehicle motion, the actuator connected to the ADAS; and a bias estimator circuit that estimates a bias between the command for the aspect of vehicle motion and an effective vehicle motion aspect, the bias estimator circuit estimating the bias using an operator that predicts a next timestep of nonlinear functions of vehicle state, wherein the command for the aspect of vehicle motion is corrected using the bias estimated by the bias estimator circuit to provide a corrected command for the aspect of vehicle motion for use by the actuator.

Implementations can include any or all of the following features. The operator is a Koopman operator applied to the nonlinear functions of vehicle state. The bias estimator circuit introduces a bias term in the nonlinear functions of vehicle state. Introducing the bias term comprises subtracting the bias term, multiplied by a coefficient, from the command for the aspect of vehicle motion. The bias estimator circuit performs recursive solving of a nonlinear least squares equation involving a cost function. The recursive solving involves applying a forgetting factor corresponding to how many previous data points to use in estimating the bias. Correcting the command for the aspect of vehicle motion comprises subtracting the bias estimated by the bias estimator circuit from the command for the aspect of vehicle motion. The aspect of vehicle motion includes steering of the vehicle. The bias estimator circuit uses at least a yaw rate of the vehicle and a velocity of the vehicle in estimating the bias. The bias estimator circuit further uses a sensed steering angle in estimating the bias. The bias estimator circuit further uses the corrected command for the aspect of vehicle motion, without a sensed steering angle, in estimating the bias. The bias estimator circuit begins using the corrected command for the aspect of vehicle motion after previously having used the sensed steering angle in estimating the bias. The bias estimator circuit begins using the corrected command for the aspect of vehicle motion based on an absence or unreliability of a steering angle sensor of the vehicle. The bias estimator circuit further uses a bank angle in estimating the bias. The bias estimator circuit further uses a wheel slip angle in estimating the bias. The bias estimator circuit further uses a lateral velocity of the vehicle in estimating the bias. The aspect of vehicle motion includes localization of the vehicle. The bias estimator circuit applies a recursive least squares. A gain of the command for the aspect of vehicle motion is known to the bias estimator circuit before estimating the bias.

In a second aspect, a computer-implemented method comprises: generating, using an advanced driver assistance system (ADAS) of a vehicle, a command for an aspect of vehicle motion for the vehicle; estimating a bias between the command for the aspect of vehicle motion and an effective vehicle motion aspect, the bias estimated using an operator that predicts a next timestep of nonlinear functions of vehicle state; correcting the command for the aspect of vehicle motion using the estimated bias to generate a corrected command for the aspect of vehicle motion; and providing the corrected command for the aspect of vehicle motion to an actuator for controlling the aspect of the vehicle motion, the actuator connected to the ADAS.

BRIEF DESCRIPTION OF DRAWINGS

FIGS. 3A-3B show examples of architectures that can be part of ADAS-equipped vehicles.

Like reference symbols in the various drawings indicate like elements.

DETAILED DESCRIPTION

Figure 1:
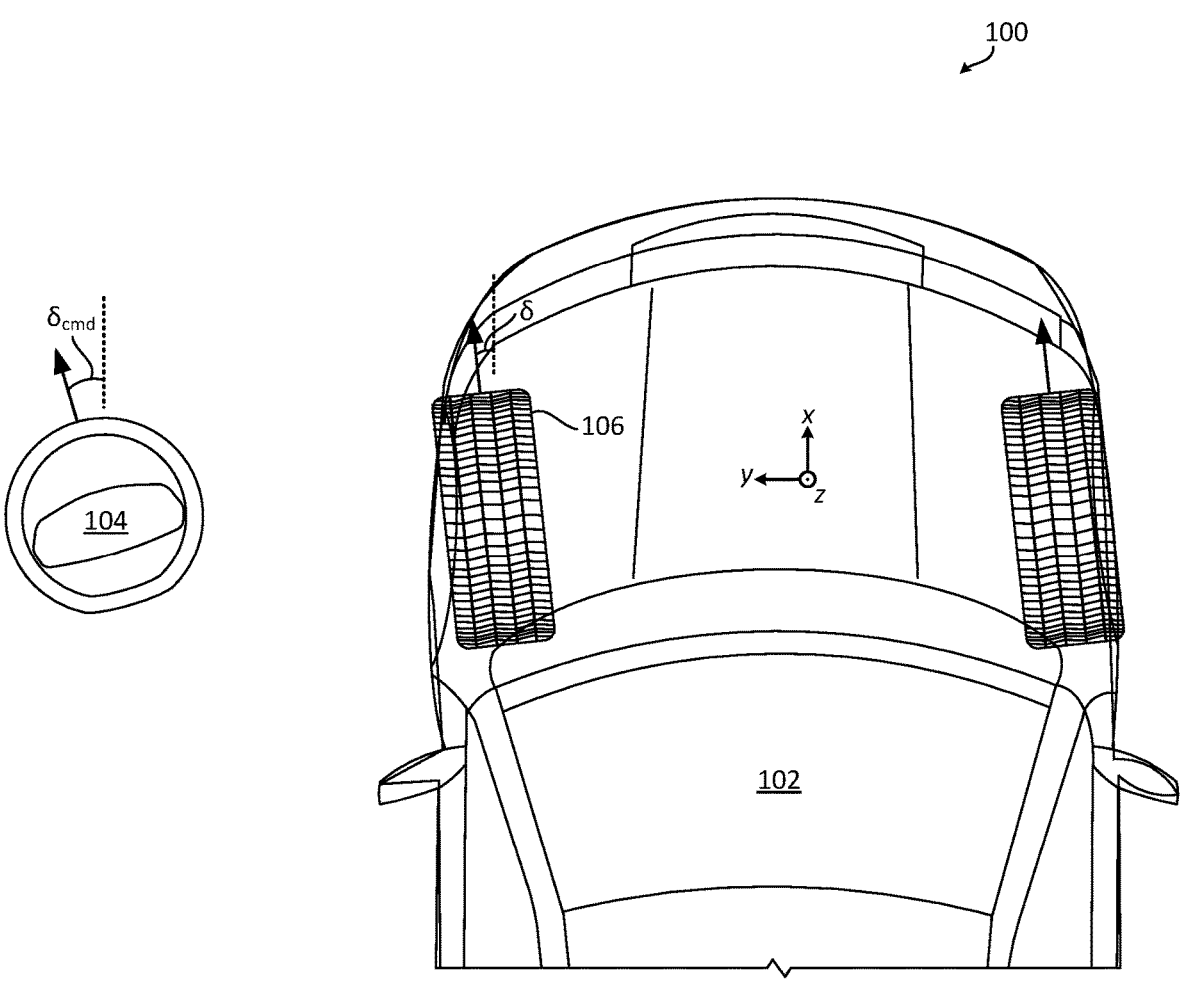
FIG. 1 schematically shows an example of a steering-wheel input command and an effective road angle.

This document describes examples of systems and techniques that estimate and correct a bias in one or more aspects of the control of vehicle motion. In some implementations, a bias in the control of vehicle steering (sometimes referred to as a steering bias) can be estimated and corrected.

A vehicle equipped with an advanced driver assistance system (ADAS) can have one or more actuators for controlling at least one aspect of the vehicle's motion, including, but not limited to, its steering. A bias in the steering system can manifest itself as discrepancies between the steering-wheel input command and the effective road wheel angle. The steering-wheel input command can be generated by the ADAS or by the driver maneuvering the steering wheel; the effective road wheel angle is the angle between the wheel(s) and the longitudinal axis of the vehicle. These can be long-term discrepancies or low-frequency discrepancies. The discrepancies can stem from mechanical variances or asymmetries, such as variances in the assembly process, wheel balancing or alignment, tire pressure differences, and/or miscalibration of an electronic power steering system or a steer-by-wire system (e.g., in one or more sensors thereof). For example, a steering bias can manifest itself as under- or oversteering when driving in a curve. In such situations, the controller of the ADAS can tend to find an equilibrium point that is away from zero; that is, when the vehicle is perfectly centered, the controller may seek to make the steering angle exactly zero, but a steering bias can then make the wheel(s) not have a zero angle and move away from the center. Therefore, the controller compensates for this, finding an equilibrium off center. As such, the present subject matter can be used to automatically estimate and correct an unknown, possibly time-varying, bias resulting from mechanical and/or calibration variability between vehicles. As mentioned, a bias can vary over time, sometimes even changing between being a positive or negative number. In some implementations, the bias estimation and correction according to the present subject matter is constantly applied when the vehicle is in operation.

In some implementations, methodology for estimating and correcting steering bias according to the present subject matter leverages the Koopman Operator framework to discover the dynamics of a system governed by differential equations, given a set of nonlinear basis functions. For example, the bias can firstly be estimated using a priori knowledge of the equations governing the kinematic motion of the vehicle. The estimated bias can then be mapped to the control input (e.g., a steering command) and can be subtracted from the control law and effectively corrected.

Disturbance estimators have been described in previous approaches. Some of them have used Luenberger Observers, a Kalman Filter, or integral control. Approaches based on integral control can tend to often result in oscillatory behavior, such as when the vehicle is entering or exiting a curve. That is, an integrator may load up, or load down, causing oscillations or overshoots. The present subject matter, by contrast, is significantly less prone to poorly damped modes and oscillations.

Approaches involving observers or a Kalman Filter are more complex to implement than the present subject matter, and are more sensitive to tuning. For example, such tuning can vary between vehicles. The present subject matter, by contrast, is less sensitive to tuning. Variability between vehicles could increase sensitivity to tuning and negatively affect performance, whereas the present subject matter is robust against vehicle/sensor variations and could have only a single tuning parameter (e.g., a constant related to how many data points are used for the computation). This can eliminate the need for complex tuning based on measurement and process covariance.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to an ADAS. In some implementations, an ADAS can perform assisted driving and/or autonomous driving. An ADAS can at least partially automate one or more dynamic driving tasks. An ADAS can operate based in part on the output of one or more sensors typically positioned on, under, or within the vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of an ADAS, not every ADAS is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., a light ranging and detection (LiDAR) device); a radio-based sensor (e.g., radar); an acoustic sensor (e.g., an ultrasonic device and/or a microphone); an inertial measurement unit (IMU) (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a thermal sensor; a temperature sensor (e.g., a primary or secondary thermometer); a pressure sensor (e.g., for ambient air or a component of the vehicle); a humidity sensor (e.g., a rain detector); or a seat occupancy sensor.

FIG. 1 schematically shows an example 100 of a steering-wheel input command and an effective road angle. The example 100 can be used with one or more other examples described elsewhere herein. The example 100 involves a vehicle 102 (of which only a front portion is shown for simplicity) and a steering wheel 104 of the vehicle 102 (which is shown separately from the vehicle 102 for clarity). The vehicle 102 has one or more wheels 106 (schematically illustrated with regard to the vehicle 102) that can be steered using the steering wheel 104. For example, a driver or an ADAS controls the steering wheel 104 to generate a steering-wheel input command corresponding to an angle $\delta_{cmd}$ between the steering wheel 104 and a longitudinal reference direction. The wheels 106, moreover, can form an angle $\delta$ with the longitudinal reference direction by turning about a rotation axis in the z direction (extending out of the drawing) as indicated by the coordinate system. When the angles $\delta_{cmd}$ and $\delta$ do not correspond to each other this can be referred to as a steering bias (for example, a zero steering-wheel input command results in a nonzero effective road angle). As such, steering is an example of an aspect of vehicle motion where the present subject matter can estimate and correct a bias.

Figure 2:
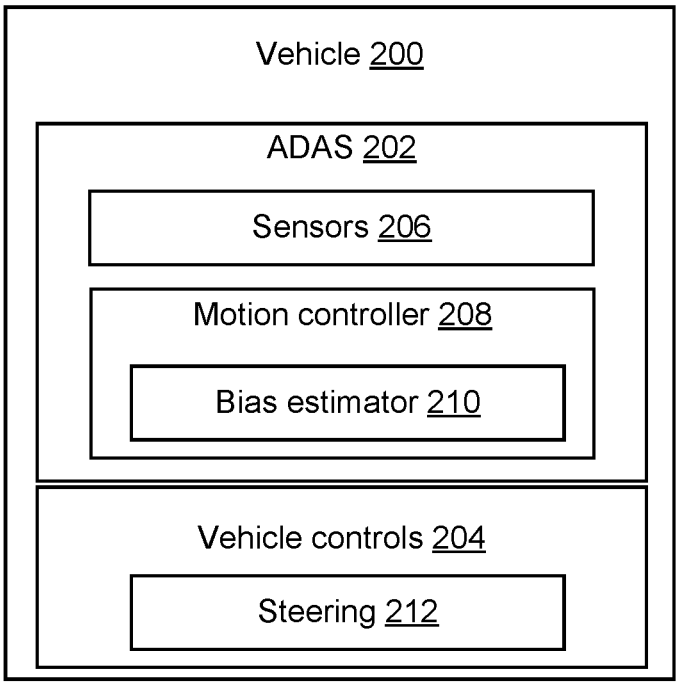
FIG. 2 shows an example of a vehicle.

FIG. 2 shows an example of a vehicle 200. The vehicle 200 can be used with one or more other examples described elsewhere herein. The vehicle 200 includes an ADAS 202 and vehicle controls 204. The ADAS 202 can be implemented using some or all components described with reference to FIG. 9 below. The ADAS 202 includes sensors 206 and a motion controller 208. The motion controller 208 can include a bias estimator 210. The vehicle controls 204 can comprise any number of controls effectuated by actuators of the vehicle, including, but not limited to, a steering control 212. Other aspects that the vehicle 200 may include are omitted here for simplicity.

The sensors 206 can include appropriate circuitry and/or executable programming for processing sensor output and performing a detection based on the processing. The sensors 206 can include a radar (e.g., any object detection system that is based at least in part on radio waves); an active light sensor (e.g., any object detection system that is based at least in part on laser light, including, but not limited to, a LiDAR); a camera (e.g., any image sensor whose signal(s) the vehicle 200 takes into account); and/or an ultrasonic sensor (e.g., any transmitter, receiver, and/or transceiver used in detecting at least the proximity of an object based on ultrasound), to name just a few examples.

The motion controller 208 can plan for the ADAS 202 to perform one or more actions, or to not perform any action, in response to monitoring of the surroundings of the vehicle 200 and/or an input by the driver. The output of one or more of the sensors 206 can be taken into account. In some implementations, the motion controller 208 can perform motion planning and/or plan a trajectory for the vehicle 200.

The steering control 212 can be configured for controlling the steering angle though a mechanical connection between the steering control 212 and the adjustable wheel, or can be part of a steer-by-wire system.

The bias estimator 210 can be implemented using at least one circuit (e.g., a chip or other processor executing stored instructions). The bias estimator 210 estimates a bias between the command for an aspect of vehicle motion and an effective vehicle motion aspect. For example, in FIG. 1 the command for an aspect of vehicle motion can be the steering-wheel input command for the angle $\delta_{cmd}$, and the effective vehicle motion aspect can be the angle $\delta$ of the wheels 106. The bias estimator 210 estimates the bias using an operator that predicts a next timestep of nonlinear functions of vehicle state. For example, the operator can be a Koopman operator and estimating the bias can involve recursively solving a least squares problem for the coefficients of a differential equation.

FIGS. 3A-3B show examples of architectures 300 and 302, respectively, that can be part of ADAS-equipped vehicles. The architecture 300 and/or 302 can be used with one or more other examples described elsewhere herein. Each of the architectures 300 and 302 includes the bias estimator 210, a controller 304 and a block 306 that here schematically represents one or more other components of the vehicle (the block 306 is labeled "vehicle" for clarity). In some implementations, the architectures 300 and 302 can be implemented in a motion controller of an ADAS-equipped vehicle. For example, the controller 304 can be an ADAS controller, and the block 306 can represent aspects of the sensors 206 and the vehicle controls 204 in FIG. 2.

The controller 304 can receive one or more inputs. In some implementations, the controller 304 is a lateral controller of the ADAS and receives a reference signal ("ref"). The reference signal can correspond to or reflect a desired lateral error of the vehicle relative to some reference (e.g., a lane marker or other landmark). The reference signal can correspond to or reflect a desired yaw and/or a yaw rate. When the vehicle travels in a curve, the curvature multiplied by the vehicle velocity gives a yaw rate, which is an angular velocity. The yaw rate can be measured relative to the z direction (FIG. 1). The reference signal can be generated by another component of the ADAS, including, but not limited to, a trajectory planner. As such, a trajectory with a certain curvature may have been planned, from which trajectory the yaw and yaw rate are determined. To the extent the value of the lateral error is constantly zero, the controller 304 may not need to receive that value from elsewhere.

The controller 304 can generate one or more outputs. In some implementations, the controller 304 generates a command for an aspect of vehicle motion. The aspect of vehicle motion can include steering of the vehicle. For example, the controller 304 can generate a steering wheel angle command corresponding to an angle $\delta_{cmd}$. That is, the controller 304 is performing one or more processes regarding vehicle control and can decide to instruct the steering actuator to apply the angle $\delta_{cmd}$ to the steerable wheel(s) of the vehicle.

The block 306 here represents vehicle components, such as a steering actuator that controls the steering of the vehicle based on one or more commands, and a sensor that indicates some aspect(s) of vehicle motion. The block 306 can provide one or more signals to the bias estimator 210. In the architecture 300, the block 306 provides a yaw rate r, a steering angle $\delta$, and a vehicle velocity v. The block 306 can provide one or more signals to the controller 304. For example, a lateral error and/or a lateral error velocity can be provided.

The bias estimator 210 can generate one or more outputs. In some implementations, the bias estimator 210 estimates a bias based on information about the aspect of vehicle motion. For example, a bias b can represent an estimated steering bias in the vehicle. The architectures 300 and 302 can include a correction block 308 that generates a corrected command for the aspect of vehicle motion. In some implementations, the corrected command is a steering-angle command that has been corrected for estimated bias. For example, the corrected command can correspond to an angle $\tilde{\delta}$ as follows:

$$\tilde{\delta} = \delta_{cmd} - b, \tag{1}$$

where b is the bias estimated by the bias estimator 210, and the correction block 308 serves as an addition/subtraction operator. That is, the corrected command corresponding to the angle $\tilde{\delta}$ is what the architectures 300 and 302 provide to the block 306, rather than the steering wheel angle command corresponding to the angle $\delta_{cmd}$.

As mentioned, in the architecture 300 the block 306 provides the yaw rate r, the steering angle $\delta$, and the vehicle velocity v to the bias estimator 210. As such, the architecture 300 is an example of using a sensed steering angle in bias estimation. Other approaches can be used. In some implementations of the architecture 302, the block 306 provides the yaw rate r and the vehicle velocity v, but not the steering angle $\delta$, to the bias estimator 210. The architecture 302 can provide the corrected command corresponding to the angle $\tilde{\delta}$ to the bias estimator 210. As such, the architecture 302 is an example of using a commanded steering angle in bias estimation without using a sensed steering angle in the bias estimation.

An ADAS-equipped vehicle can switch between two or more architectures of the motion controller, such as between the architectures 300 and 302. In some implementations, the bias estimator 210 can begin using the corrected command (e.g., corresponding to the angle $\tilde{\delta}$) for the aspect of vehicle motion after the bias estimator 210 previously was using the sensed steering angle (e.g., the steering angle $\delta$) in estimating the bias. Such a switch can be triggered by one or more events or situations. In some implementations, the bias estimator 210 can begin using the corrected command because of an absence or unreliability of a steering angle sensor of the vehicle. Other approaches can be used.

Figure 4A:
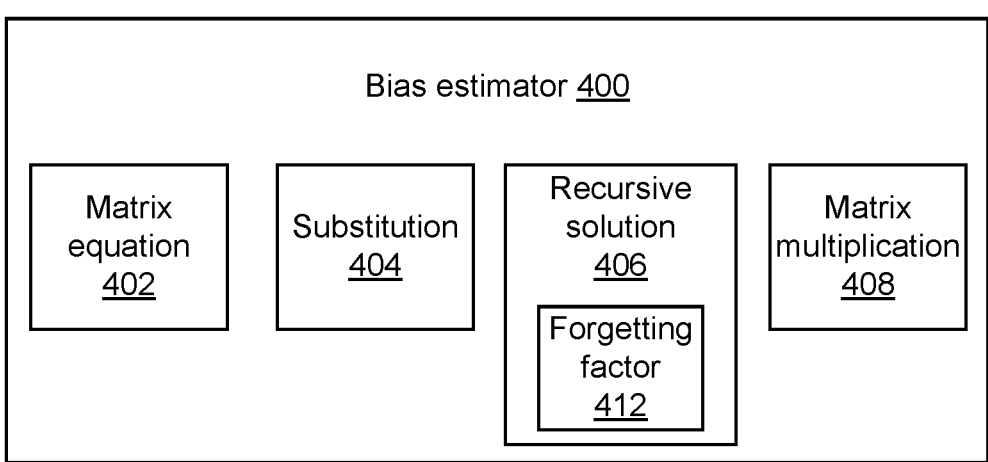
FIGS. 4A-4B show block diagrams of examples of a bias estimator.

FIG. 4A shows a block diagram of an example of a bias estimator 400. The bias estimator 400 can be implemented using aspects described with reference to FIG. 9 below, and can be used with one or more other examples described elsewhere herein. The bias estimator 400 can include a matrix equation component 402, a substitution component 404, a recursive solution component 406, and a matrix multiplication component 408. The bias estimator 400 can estimate bias between a command for an aspect of vehicle motion and an effective vehicle motion aspect. The bias estimator 400 can do this using an operator that predicts a next timestep of nonlinear functions of vehicle state, for example as will now be described.

Information about the aspect of vehicle motion can include a data set, such as a set of data regarding steering expressed as basis functions representing respective states of the vehicle. Here, a set of basis functions will be named $\psi$ and can depend on multiple values. For example:

$$\psi = \begin{bmatrix} \dfrac{r}{v} & v_y & \delta & c \end{bmatrix}^T, \tag{2}$$

where r is the yaw rate, v is the vehicle velocity, $v_y$ is the lateral velocity in the y direction (FIG. 1), $\delta$ is the sensed or commanded steering angle, and c is a chosen constant to be discussed below.

The sets of basis functions at different time steps can be related to each other by way of a Koopman operator, in which case the sets of basis functions can be referred to as observables. For example:

$$\psi(k+1) = K\psi(k), \tag{3}$$

where $\psi$ can be defined as in Equation 2, K is the Koopman operator (i.e., a matrix) applied to the nonlinear functions of state, and k+1 is the next time step after the time step k. That is, the data set of $\psi(k+1)$ is the next state after the data set of $\psi(k)$, wherein the Koopman operator K shifts the data set of $\psi(k)$ one time step into the future. As such, the Koopman operator K is defined by Equation 3, which can be articulated by the bias estimator 400 using the matrix equation component 402.

Bias can be estimated by finding the Koopman operator K that minimizes the prediction error according to a norm. For example, the minimization can be expressed as:

$$\min_K \ \frac{1}{2}\|\Psi^+ - K\Psi\|_F^2, \tag{4}$$

where the expressions $\Psi^+ = \Psi(k+1)$ and $\Psi = \Psi(k)$ are used, $\Psi$ being a matrix with a dictionary of collected data stacked column-wise so that $\Psi^+$ is the time-shifted version of $\Psi$, and where $\|X\|_F = \sqrt{\text{Trace}(X^T X)}$ is the Frobenius norm.

To illustrate how minimization of Expression 4 can be performed, some examples of the sets of basis functions will first be discussed. The first row of Equation 3, having the dimensionality as indicated in Equation 2, can be:

$$\frac{r(k+1)}{v(k+1)} = k_{11}\frac{r(k)}{v(k)} + k_{12}v_y(k) + k_{13}\delta(k) + k_{14}c, \tag{5}$$

where the term $k_{14}c$ is the bias estimate that needs to be compensated for. The Koopman operator K is time-varying, and therefore the coefficients (e.g., $k_{11}$ through $k_{14}$) are also functions of the current time step. To cancel out the bias term, the estimate can be mapped to the input space (e.g., steering angle) and subtracted from the control action. In some implementations, this can be done by dividing by the input gain such that $$\frac{r(k+1)}{v(k+1)} = k_{11}\frac{r(k)}{v(k)} + k_{12}v_y(k) + k_{13}\left(\delta_{cmd} - \frac{k_{14}}{k_{13}}c\right) + k_{14}c, \tag{6}$$

which effectively cancels the bias. The newly defined input to the vehicle (e.g., the input to the block 306 in FIGS. 3A-3B) can be $$\tilde{\delta} = \delta_{cmd} - \frac{k_{14}}{k_{13}}c. \tag{7}$$

In attempting to address situations such as the existence of a steering bias, a system may be constrained by the fact that only the commanded steering angle can be regulated by the controller. In Equation 5, the system should try to get rid of the term $k_{14}c$ which represents bias, and this can be done by adding something to the steering angle. The steering angle has intrinsic gain (in Equation 5 the coefficient $k_{13}$) which is also being identified in the process. Therefore, the gain of the estimator (i.e., the coefficient $k_{14}$) should be divided by the gain of the input (i.e., the coefficient $k_{13}$). Hence the expression in Equation 7 can be obtained, and this change of expression from the angle $\delta_{cmd}$ (obtained from the controller) to the angle $\tilde{\delta}$ can be performed by the substitution component 404. As such, the bias estimator 400 can introduce a bias term in the Equation 6, such as by subtracting the constant c multiplied by the coefficient $k_{14}/k_{13}$ as discussed above. If no bias existed, this term should equal zero. The constant c can be chosen in the order of magnitude of the other variables in the Equation 2 to represent the bias.

Expression 4 can be minimized analytically by finding its derivative and setting that equal to zero, and then solving $$K\Psi\Psi^T = \Psi^+\Psi^T. \qquad (8)$$

One can then define $$K = AG^\dagger, \qquad (9)$$

based on $$G = \frac{1}{P}\Psi\Psi^T = \frac{1}{P}\sum_{p=1}^{P}\psi_p\psi_p^T \qquad (10)$$

$$A = \frac{1}{P}\Psi^+\Psi^T = \frac{1}{P}\sum_{p=1}^{P}\psi_{p+1}\psi_p^T \qquad (11)$$

where P is the number of data points stored in a dictionary (e.g., collected data reflecting whether a steering bias exists).

However, if the number P is very large because a great number of data points are considered, minimizing Expression 4 analytically may be prohibitively challenging in an online implementation where the vehicle motion is to be controlled at a relatively high frequency. The recursive solution component 406 can therefore perform a recursive computation instead of storing data in a dictionary. For example, the following are recursive versions of Equations 10 and 11, respectively, that go from state k−1 to state k:

$$(12)$$

$$G(k) = (1-\lambda)G(k-1) + \lambda\begin{bmatrix} \frac{r(k-1)}{v(k-1)} \\ v_y(k-1) \\ \delta(k-1) \\ c \end{bmatrix}\begin{bmatrix} \frac{r(k-1)}{v(k-1)} & v_y(k-1) & \delta(k-1) & c \end{bmatrix}$$

$$(13)$$

$$A(k) = (1-\lambda)A(k-1) + \lambda\begin{bmatrix} \frac{r(k)}{v(k)} \\ v_y(k) \\ \delta(k) \\ c \end{bmatrix}\begin{bmatrix} \frac{r(k-1)}{v(k-1)} & v_y(k-1) & \delta(k-1) & c \end{bmatrix}$$

where $\lambda\in(0\ 1)$ is a forgetting factor in the recursive solution of the minimization problem. In some implementations, the forgetting factor can represent how many previous data points of the data sets that should be used. For example, the forgetting factor can be the sole tuning parameter in an implementation of a bias estimator, thus providing an essentially tuning-free approach where only the constant forgetting factor is a tuning parameter. The recursive solution component 406 can apply a forgetting factor to one or more variables using a forgetting factor component 412.

That is, the recursive solution using Equations 12 and 13 can be a recursive solving of a nonlinear least squares equation (seeking to find a matrix rather than a vector), the nonlinear least squares equation involving a cost function such as Expression 4. For example, Expression 4 can be linear as written here, and the sets of basis functions $\psi$ and $\psi^+$ can be nonlinear.

The Koopman operator K can then be calculated as $$K(k) = A(k)G(k)^\dagger \qquad (14)$$

which can be performed by the matrix multiplication component 408. That is, calculating the Koopman operator K gives a term (e.g., $k_{14}c$) that reflects the bias. At least one post-filter can be applied to the calculations in the estimation of bias. In some implementations, this can suppress peaks due to numerical instability. For example, peaks can result particularly at the beginning of measurements where there may not be enough data to dampen large values.

Some examples above use the lateral velocity $v_y$ in estimating the bias, which takes into account forces in a dynamic equation. In some implementations, the lateral velocity can be omitted from the bias estimation. The dynamics can then correspond to a kinematic model of vehicle motion and control.

In some implementations, a recursive least squares can be used in which components of a parameter vector are calculated from one timestep to a next timestep. For example, an output of interest y can be defined as:

$$y = \frac{r}{v}$$

where r is the yaw rate and v is the vehicle velocity. Basis functions $\phi$ can be defined as $$\phi = [v_y\ \delta\ c]^T,$$

a parameter vector $\theta$ can be defined as $$\theta = [\theta_1\ \theta_2\ \theta_3]^T,$$

and the model can then be given by $$y = \phi^T\theta.$$

In analogy with Expression 4 above, a minimization problem can be solved here as well. The minimization problem can be given by $$J = \frac{1}{2}\|Y - \Phi\theta\|^2 = \sum_{i=0}^{P-1}(y_{i+1} - \phi_i^T)^2, \qquad (15)$$

where $Y=[y_1\ y_2\ \ldots\ y_P]^T$ and $\Phi=[\phi_0\ \phi_1\ \ldots\ \phi_{P-1}]^T$ for P number of data points or timesteps. The above operations can be handled by the matrix equation component 402 (FIG. 4A).

A recursive solution to Equation 15 can then be performed by the recursive solution component 406 (FIG. 4A). The recursive solution can be given by $$\theta_{k+1} = \theta_k + P_k\phi_k\left(\lambda I + \phi_k^T P_k \phi_k\right)^{-1}\left(y_k - \phi_k^T \theta_k\right), \qquad (16)$$

$$P_{k+1} = \frac{1}{\lambda}P_k\left(I - \phi_k\left(\lambda I + \phi_k^T P_k \phi_k\right)^{-1}\phi_k^T P_k\right), \qquad (17)$$

where indices k+1 and k indicate the respective timesteps; P is a covariance matrix, properly initialized; $\lambda$ is a forgetting factor, in analogy with Equations 12 and 13 above; and I is the identity matrix. That is, Equations 16 and 17 can be used for predicting a next timestep of nonlinear functions of vehicle state.

A bias estimate can then be calculated, using a derivation in analogy with the above description regarding Equation 5 and Equation 6, by $$b = \frac{\theta_3}{\theta_2}c. \qquad (18)$$

That is, the Equation 18 can provide a bias estimate that can be used in generating a corrected command for an aspect of vehicle motion, including, but not limited to, by way of Equation 1 above.

The above calculations can be modified if one or more pieces of information about the system is known beforehand. In some implementations, a priori information about a vehicle model can be available and used. For example, the input gain corresponding to the steering input, $\theta_2$ in the above definition of the parameter vector $\theta$, can be determined. This or another known information can be included by redefining the output of interest to instead be $$y = \frac{r}{v} - \theta_2\delta, \qquad (19)$$

thus making the basis functions $$\phi = [v_y \ c]^T \qquad (20)$$

and the unknown parameter vector $$\theta = [\theta_1 \ \theta_3]^T. \qquad (21)$$

The known gain, e.g., $\theta_2$, may be determined up to a particular level of uncertainty, which can affect the accuracy of the approach of modifying the calculations based on known information. However, because the denominator in Equation 18 is then constant, the approach can be less prone to sudden variations. In some implementations, the approach of Equation 19 can be applied if variations are detected, or when not enough data points have been collected (e.g., at the beginning of the data collection). The approach of Equation 18, moreover, can be used under steady state conditions. The bias estimator 400 (FIG. 4A) can smoothly switch between these variants.

Figure 4B:
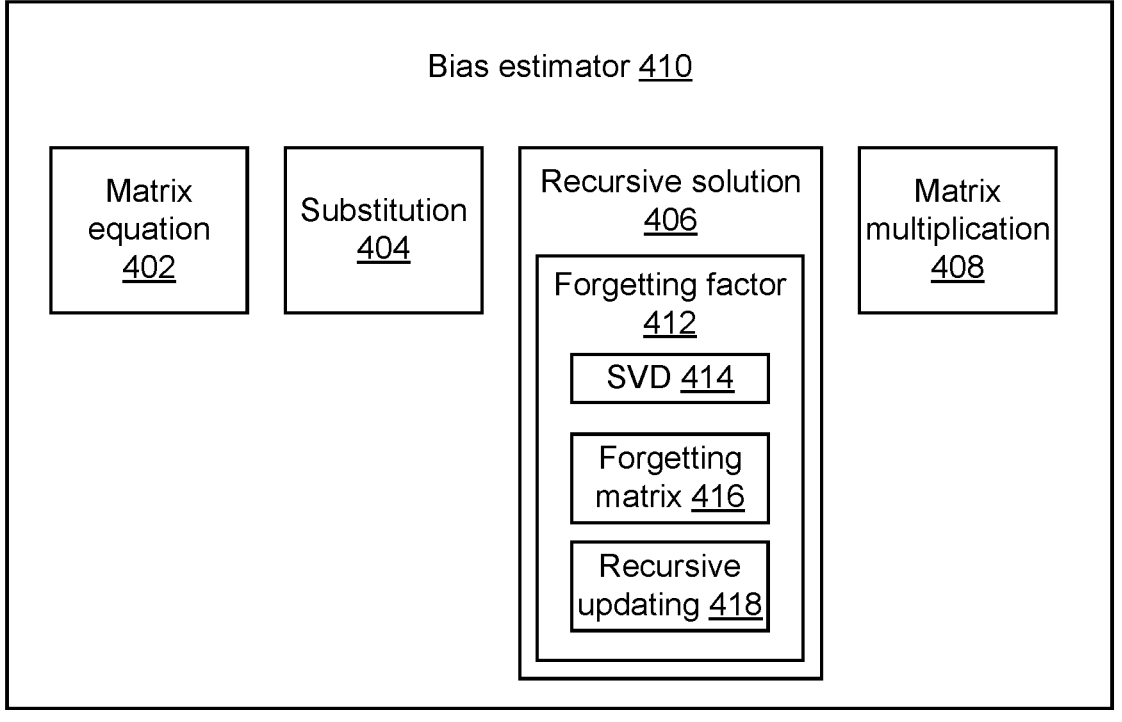

As mentioned above, a forgetting factor can be used in a recursive solution. FIG. 4B shows a block diagram of an example of a bias estimator 410 where the recursive solution component 406 includes the forgetting factor component 412. Other components of the bias estimator 410 may be similar or identical to the corresponding component of the bias estimator 400 (FIG. 4A) and will not be described in detail in the following. The bias estimator 410 can be implemented using aspects described with reference to FIG. 9 below, and can be used with one or more other examples described elsewhere herein.

In some implementations, a forgetting matrix can instead be used in a recursive solution (sometimes referred to as a matrix forgetting factor). A forgetting matrix can help to choose different forgetting factors for different directions (i.e., for different variables). Furthermore, by letting the entries in the matrix vary with time, the learning rate for each direction can be adapted depending on the richness of the data. Recursive algorithms can become unstable when the input data is not persistently exciting, i.e., when the algorithm lacks new information. For example, a covariance matrix can tend towards zero, and its projected inverse (e.g., Equation (21) below) can tend towards infinity. For this reason, it can be convenient to adapt the forgetting factor to unity in one or more directions that may not be sufficiently persistently exciting. In this way, older data will not be forgotten and the algorithm can be made more robust against a loss of persistence of excitation.

A matrix forgetting factor that is variable-direction adaptive can be computed as follows. One or more singular value decompositions can be performed by a singular value decomposition (SVD) component 414. In some implementations, a covariance matrix and/or a projected input vector can be subject to singular value decomposition. For example, a covariance matrix (e.g., the covariance matrix P in Equations (16) and (17)) can be decomposed as $$P_k = U_k \Sigma U_k^T,$$

where $U_k$, $\Sigma$, and $$U_k^T$$

are matrices. The projected input vector (e.g., the basis functions $\psi$ in Equation (2)) can be decomposed as $$\psi_k = \phi_k U_k.$$

A forgetting matrix denoted as $\Lambda$ can be configured for choosing different forgetting factors for different variables. The diagonal entries of the inverse of the forgetting matrix can be given by $$\Lambda(i, i)^{-1} = \begin{cases} \dfrac{1}{\sqrt{\lambda}}, & \|\psi_k^i\| > \varepsilon \\ 1, & \text{otherwise} \end{cases},$$

where the superscript $^i$ denotes the ith column, $\lambda$ is the default forgetting factor (e.g., as in Equations (16) and (17)), and $\varepsilon$ is a tolerance that should be larger than the signal-to-noise ratio of the inputs. The actual forgetting factor $\Lambda$ need not be computed, only its inverse, and this can be performed by a forgetting matrix component 416 of the forgetting factor component 412.

Finally, the matrices $$B_k = U_k \Lambda^{-1} U_k^T, \text{ and}$$

$$L_k = B_k P_k B_k^T$$

can be computed. A recursive updating component 418 of the forgetting factor component 412 can provide the following updates of the covariance matrix and the estimated parameters $$P_{k+1} = L_k \left( I - \phi_k \left( I + \phi_k^T L_k \phi_k \right)^{-1} \phi_k^T L_k \right), \text{ and} \tag{20}$$

$$\theta_{k+1} = \theta_k + P_{k+1} \phi_k \left( y_k - \phi_k^T \theta_k \right). \tag{21}$$

In using Equations (20) and (21), the inputs can be projected into the directions implicated by the covariance matrix. If the individual projected inputs contain enough information the default forgetting factor can be used. Otherwise, a forgetting factor $\lambda = 1$ can be used (i.e., so that data is no longer forgotten).

Figure 5:
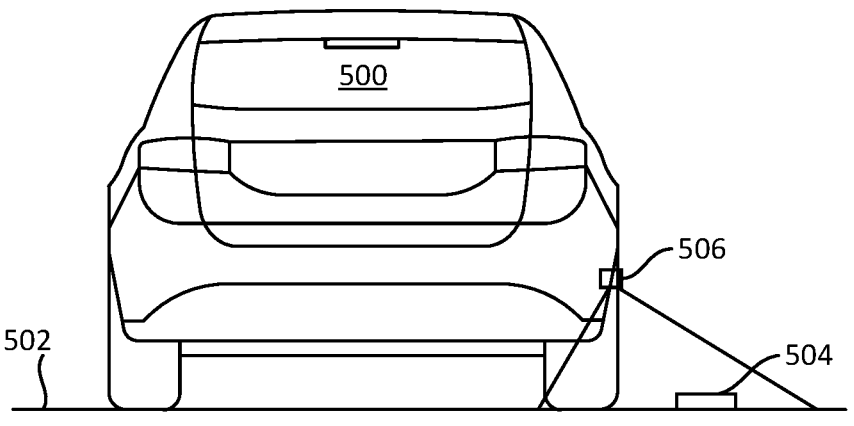
FIG. 5 shows an example of estimating bias in localization of a vehicle.

FIG. 5 shows an example of estimating bias in localization of a vehicle 500. The vehicle 500 is here located at (e.g., driving on) a surface 502 and the present example can be used with one or more other examples described elsewhere herein. Localization of the vehicle 500 is an example of an aspect of vehicle motion for which the present subject matter can estimate and correct bias. An ADAS controller can specify that the vehicle 500 should be positioned x millimeters away from a road marker 504 on the surface 502, or any other landmark.

The ADAS can use one or more types of sensors in performing the localization of the vehicle 500. Here, a sensor 506 is shown schematically detecting the position of the vehicle 500 relative to the road marker 504 for purposes of localization. A camera, an IMU, a wheel odometry meter, and/or a Global Positioning System receiver, can be used in performing the localization, to name just a few examples. To the extent that a bias occurs between the command for the localization and the effective localization, bias estimation and correction can be performed substantially as described in examples herein. For example, localization-relevant signals or other outputs can be used in Equation 2, and the Equation 7 can instead be formulated to correct for bias in the control of localization, and so on.

Figure 6:
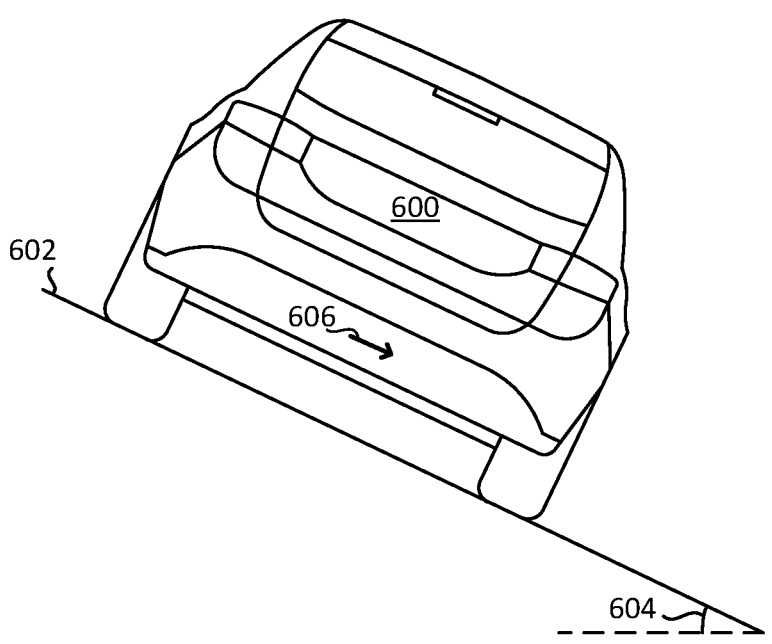
FIG. 6 shows an example of taking into account a bank angle in estimating and correcting steering bias.

FIG. 6 shows an example of taking into account a bank angle in estimating and correcting steering bias. A vehicle 600 is here located at (e.g., driving on) a surface 602 that has a bank angle 604 relative to a horizontal reference plane. The bank angle 604 can be determined using an IMU, for example. The present example can be used with one or more other examples described elsewhere herein.

Due to the bank angle 604, a lateral force 606 acts on the vehicle 600 in the direction opposite the direction at which the surface 602 is banked. When the vehicle 600 is driving on the surface 602 having the bank angle 604, the vehicle 600 can be characterized as being in a rolled position. Driving in a rolled position can perturb certain aspects of an ADAS, such as the steering. For example, a bias estimator for correcting steering bias can be perturbed and can apply a nonzero steering angle in the direction opposite to the lateral force 606. However, if the roadway of the surface 602 is currently straight, this means that the yaw rate is constantly zero. The bias estimator is then effectively trying to determine and eliminate the difference between the commanded steer angle and the effective road angle that results from the surface 602 having the bank angle 604. To address this situation, the bank angle 604 can be taken into account by the bias estimator. For example, a dimension reflecting the bank angle 604 can be added as another dimension in the set of basis functions in Equation 2, so that the bias estimator can correct also the bias resulting from this circumstance.

Figure 7:
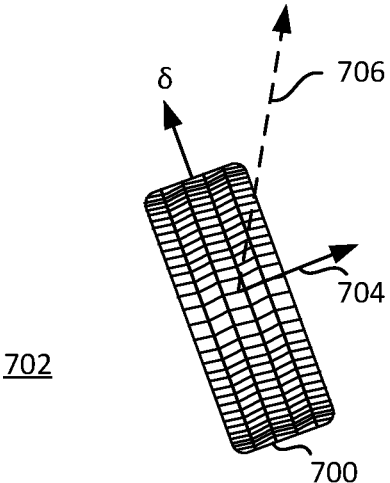
FIG. 7 shows an example of taking into account a slip angle in estimating and correcting steering bias.

FIG. 7 shows an example of taking into account a slip angle in estimating and correcting steering bias. A wheel 700 is here a steerable wheel of a vehicle that is positioned on a surface 702. The wheel 700 currently has a steering angle δ relative to a longitudinal reference axis of the rest of the vehicle. The rest of the vehicle is not shown here for simplicity. The present example can be used with one or more other examples described elsewhere herein.

The wheel 700 is rotating and also slipping laterally relative to the surface 702 as schematically indicated by an arrow 704. The lateral slip causes the wheel to not travel exactly according to the steering angle δ. For example, the steering angle δ may be 45 degrees, but if the wheel 700 is slipping due to the arrow 704, a velocity vector 706 of the wheel 700 is not 45 degrees but rather has a different value (e.g., 30 degrees). The angle of the lateral slip and/or of the velocity vector 706 can be computed based on sensor signals and used to improve bias estimation and correction. To address this situation, the angle of the lateral slip and/or of the velocity vector 706 can be taken into account by the bias estimator. For example, a dimension reflecting the lateral slip can be added as another dimension in the set of basis functions in Equation 2, so that the bias estimator can correct also the bias resulting from this circumstance.

Figure 8:
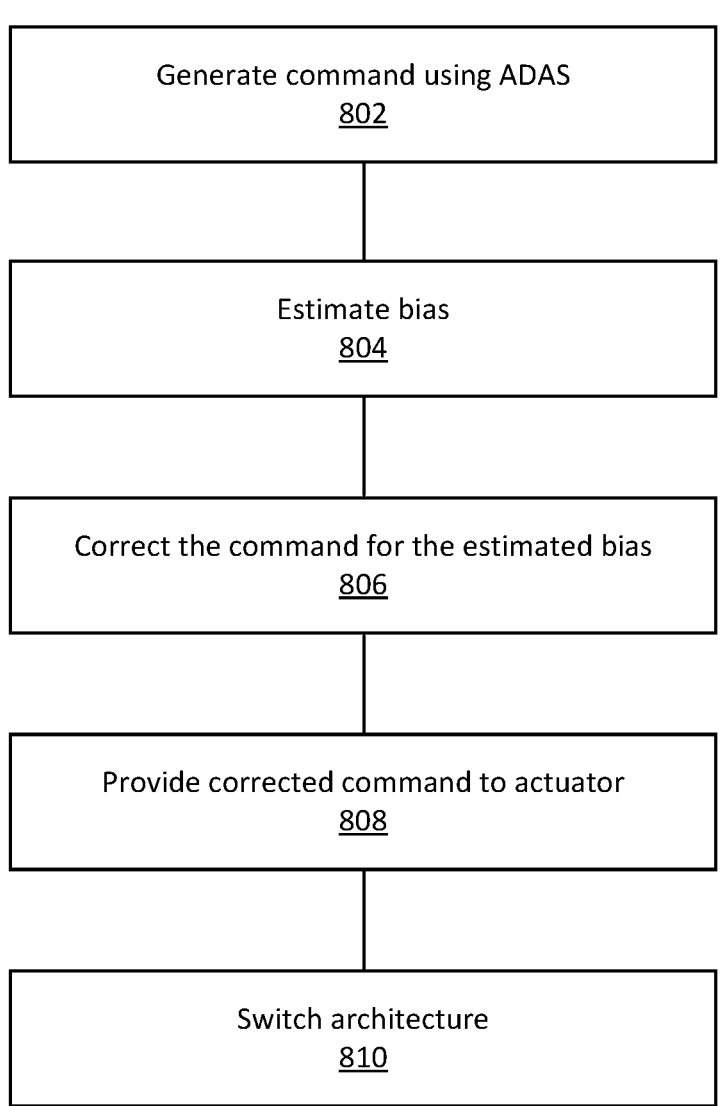
FIG. 8 shows an example of a method.

FIG. 8 shows an example of a method 800. The method 800 can be used with one or more other examples described elsewhere herein. More or fewer operations than shown can be performed. Two or more operations can be performed in a different order unless otherwise indicated.

In operation 802, an ADAS can generate a command for an aspect of vehicle motion. For example, the controller 304 (FIGS. 3A-3B) can generate a steering wheel angle command corresponding to an angle $\delta_{cmd}$.

In operation 804, a bias can be estimated. For example, the minimization problem of Expression 4 can be recursively solved to determine the Koopman operator according to Equation 14, which gives the bias estimate.

In operation 806, the command from the controller can be corrected for the estimated bias. For example, the command corresponding to the angle $\tilde{\delta}$ can be determined according to Equation 7.

In operation 808, the corrected command can be provided to the actuator. For example, the block 306 receives the command corresponding to the angle $\tilde{\delta}$.

In operation 810, the motion controller can switch from one architecture to another. For example, after first operating using the architecture 300 (FIG. 3A), where a sensed steering angle is taken into account in estimating the bias, the motion controller can instead begin using the architecture 302 (FIG. 3B), where the commanded steering angle, and not the sensed steering angle, is used in estimating the bias.

Figure 9:
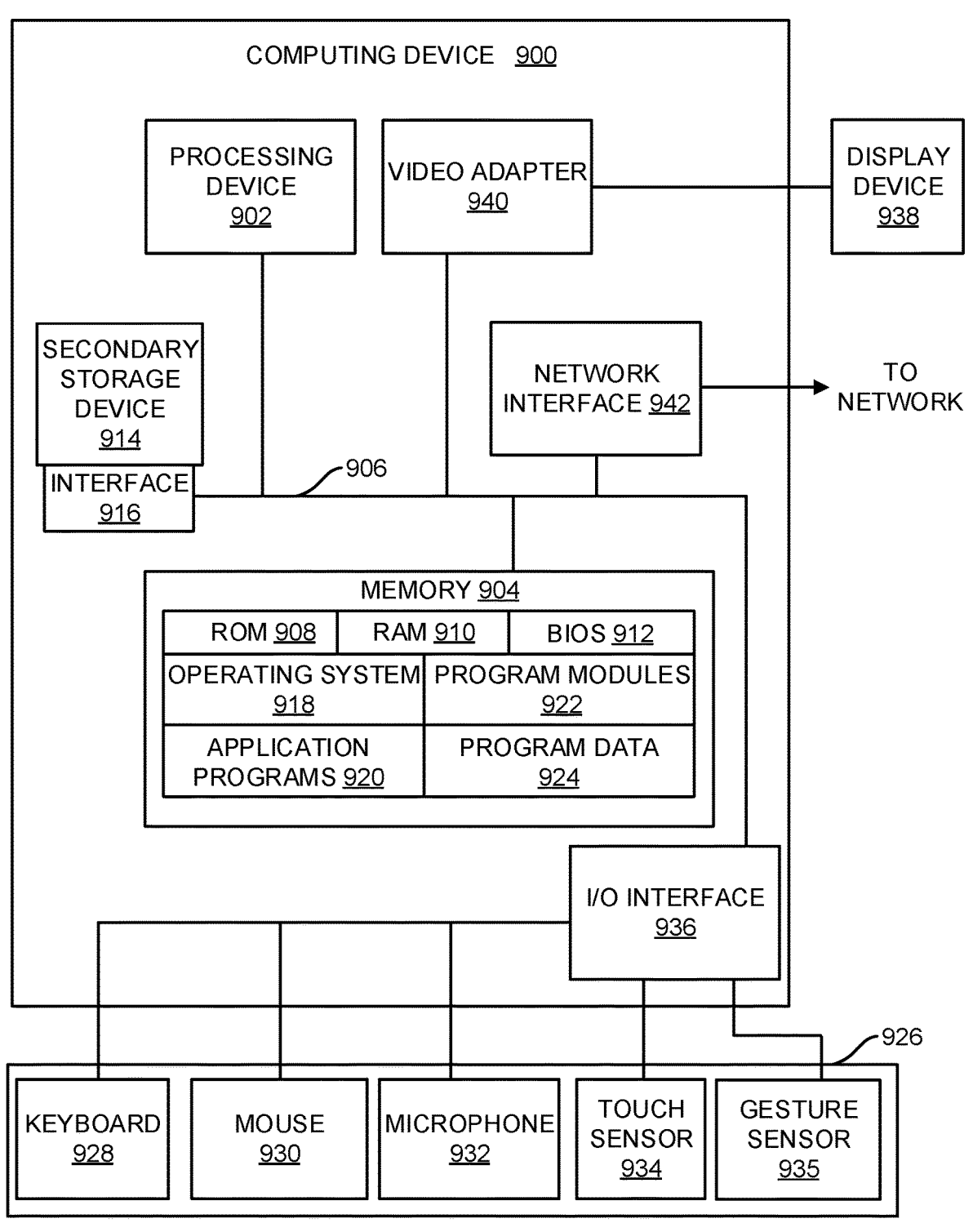
FIG. 9 illustrates an example architecture of a computing device that can be used to implement aspects of the present disclosure.

FIG. 9 illustrates an example architecture of a computing device 900 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 9 can be used to execute the operating system, application programs, and/or software modules (including the software engines) described herein.

The computing device 900 includes, in some embodiments, at least one processing device 902 (e.g., a processor), such as a central processing unit (CPU). A variety of processing devices are available from a variety of manufacturers, for example, Intel or Advanced Micro Devices. In this example, the computing device 900 also includes a system memory 904, and a system bus 906 that couples various system components including the system memory 904 to the processing device 902. The system bus 906 is one of any number of types of bus structures that can be used, including, but not limited to, a memory bus, or memory controller; a peripheral bus; and a local bus using any of a variety of bus architectures.

Examples of computing devices that can be implemented using the computing device 900 include an electronic control unit (ECU), a desktop computer, a laptop computer, a tablet computer, a mobile computing device (such as a smart phone, a touchpad mobile digital device, or other mobile devices), or other devices configured to process digital instructions.

The system memory 904 includes read only memory 908 and random access memory 910. A basic input/output system 912 containing the basic routines that act to transfer information within computing device 900, such as during start up, can be stored in the read only memory 908.

The computing device 900 also includes a secondary storage device 914 in some embodiments, such as a hard disk drive, for storing digital data. The secondary storage device 914 is connected to the system bus 906 by a secondary storage interface 916. The secondary storage device 914 and its associated computer readable media provide non-volatile and non-transitory storage of computer readable instructions (including application programs and program modules), data structures, and other data for the computing device 900.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 914 and/or system memory 904, including an operating system 918, one or more application programs 920, other program modules 922 (such as the software engines described herein), and program data 924. The computing device 900 can utilize any suitable operating system.

In some embodiments, a user provides inputs to the computing device 900 through one or more input devices 926. Examples of input devices 926 include a keyboard 928, mouse 930, microphone 932 (e.g., for voice and/or other audio input), touch sensor 934 (such as a touchpad or touch sensitive display), and gesture sensor 935 (e.g., for gestural input). In some implementations, the input device(s) 926 provide detection based on presence, proximity, and/or motion. Other embodiments include other input devices 926. The input devices can be connected to the processing device 902 through an input/output interface 936 that is coupled to the system bus 906. These input devices 926 can be connected by any number of input/output interfaces, such as a parallel port, serial port, game port, or a universal serial bus. Wireless communication between input devices 926 and the input/output interface 936 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 938, such as a monitor, liquid crystal display device, light-emitting diode display device, projector, or touch sensitive display device, is also connected to the system bus 906 via an interface, such as a video adapter 940. In addition to the display device 938, the computing device 900 can include various other peripheral devices (not shown), such as speakers or a printer.

The computing device 900 can be connected to one or more networks through a network interface 942. The network interface 942 can provide for wired and/or wireless communication. In some implementations, the network interface 942 can include one or more antennas for transmitting and/or receiving wireless signals. When used in a local area networking environment or a wide area networking environment (such as the Internet), the network interface 942 can include an Ethernet interface. Other possible embodiments use other communication devices. For example, some embodiments of the computing device 900 include a modem for communicating across the network.

The computing device 900 can include at least some form of computer readable media. Computer readable media includes any available media that can be accessed by the computing device 900. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 900.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 9 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 900 can be characterized as an ADAS computer. For example, the computing device 900 can include one or more components sometimes used for processing tasks that occur in the field of artificial intelligence (AI). The computing device 900 then includes sufficient processing power and necessary support architecture for the demands of ADAS or AI in general. For example, the processing device 902 can include a multicore architecture. As another example, the computing device 900 can include one or more co-processors in addition to, or as part of, the processing device 902. In some implementations, at least one hardware accelerator can be coupled to the system bus 906. For example, a graphics processing unit can be used. In some implementations, the computing device 900 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle comprising:
an advanced driver assistance system (ADAS) generating a command for an aspect of vehicle motion;
an actuator for controlling the aspect of the vehicle motion, the actuator connected to the ADAS; and
a bias estimator circuit that estimates a bias between the command for the aspect of vehicle motion and an effective vehicle motion aspect, the bias estimator circuit estimating the bias using an operator that predicts a next timestep of nonlinear functions of vehicle state, wherein the command for the aspect of vehicle motion is corrected using the bias estimated by the bias estimator circuit to provide a corrected command for the aspect of vehicle motion for use by the actuator which operates using the corrected command for the aspect of vehicle motion.

2. The vehicle of claim 1, wherein the operator is a Koopman operator applied to the nonlinear functions of vehicle state.

3. The vehicle of claim 1, wherein the bias estimator circuit introduces a bias term in the nonlinear functions of vehicle state.

4. The vehicle of claim 3, wherein introducing the bias term comprises subtracting the bias term, multiplied by a coefficient, from the command for the aspect of vehicle motion.

5. The vehicle of claim 1, wherein the bias estimator circuit performs recursive solving of a nonlinear least squares equation involving a cost function.

6. The vehicle of claim 5, wherein the recursive solving involves applying a forgetting factor.

7. The vehicle of claim 6, wherein the forgetting factor corresponds to how many previous data points to use in estimating the bias.

8. The vehicle of claim 6, wherein the forgetting factor is a forgetting matrix configured for choosing different forgetting factors for different variables.

9. The vehicle of claim 1, wherein correcting the command for the aspect of vehicle motion comprises subtracting the bias estimated by the bias estimator circuit from the command for the aspect of vehicle motion.

10. The vehicle of claim 1, wherein the aspect of vehicle motion includes steering of the vehicle.

11. The vehicle of claim 10, wherein the bias estimator circuit uses at least a yaw rate of the vehicle and a velocity of the vehicle in estimating the bias.

12. The vehicle of claim 11, wherein the bias estimator circuit further uses a sensed steering angle in estimating the bias.

13. The vehicle of claim 11, wherein the bias estimator circuit further uses the corrected command for the aspect of vehicle motion, without a sensed steering angle, in estimating the bias.

14. The vehicle of claim 13, wherein the bias estimator circuit begins using the corrected command for the aspect of vehicle motion after previously having used the sensed steering angle in estimating the bias.

15. The vehicle of claim 14, wherein the bias estimator circuit begins using the corrected command for the aspect of vehicle motion based on an absence or unreliability of a steering angle sensor of the vehicle.

16. The vehicle of claim 11, wherein the bias estimator circuit further uses a bank angle in estimating the bias.

17. The vehicle of claim 11, wherein the bias estimator circuit further uses a wheel slip angle in estimating the bias.

18. The vehicle of claim 11, wherein the bias estimator circuit further uses a lateral velocity of the vehicle in estimating the bias.

19. The vehicle of claim 1, wherein the aspect of vehicle motion includes localization of the vehicle.

20. The vehicle of claim 1, wherein the bias estimator circuit applies a recursive least squares.

21. The vehicle of claim 20, wherein a gain of the command for the aspect of vehicle motion is known to the bias estimator circuit before estimating the bias.

22. The vehicle of claim 1, wherein the operator is applied to the nonlinear functions of vehicle state.

23. A computer-implemented method comprising:

generating, using an advanced driver assistance system (ADAS) of a vehicle, a command for an aspect of vehicle motion for the vehicle;

estimating a bias between the command for the aspect of vehicle motion and an effective vehicle motion aspect, the bias estimated using an operator that predicts a next timestep of nonlinear functions of vehicle state;

correcting the command for the aspect of vehicle motion using the estimated bias to generate a corrected command for the aspect of vehicle motion; and providing the corrected command for the aspect of vehicle motion to an actuator connected to the ADAS for controlling the aspect of the vehicle motion such that the actuator operates using the corrected command for the aspect of vehicle motion.

24. The computer-implemented method of claim 23, wherein estimating the bias comprises performing recursive solving of a nonlinear least squares equation involving a cost function, wherein the recursive solving involves applying a forgetting matrix configured for choosing different forgetting factors for different variables.

* * * * *